US005401423A

United States Patent [19]

Leung et al.

[11] Patent Number: 5,401,423

[45] Date of Patent: Mar. 28, 1995

[54] FEED ACCELERATOR SYSTEM INCLUDING ACCELERATOR DISC

[75] Inventors: Woon F. Leung, Norfolk; Ascher H. Shapiro, Jamaica Plain, both of Mass.

[73] Assignee: Baker Hughes Incorporated, Houston, Tex.

[21] Appl. No.: 800,185

[22] Filed: Nov. 27, 1991

[51] Int. Cl.[6] .......... B01D 17/038

[52] U.S. Cl. .......... 210/787; 210/377

[58] Field of Search .......... 494/37, 45, 53, 43; 210/360.1, 359, 787, 512.3, 377, 456

[56] References Cited

U.S. PATENT DOCUMENTS

| | | |
|---|---|---|
| 579,301 | 3/1897 | Lundstrom . |
| 1,336,722 | 4/1920 | Behr . |
| 1,387,661 | 8/1921 | Pankrath . |
| 1,536,988 | 5/1925 | Thomassen . |
| 1,975,539 | 10/1934 | Elrod . |
| 2,138,467 | 11/1938 | Ayres et al. . |
| 2,138,468 | 11/1938 | Ayres . |
| 2,199,849 | 5/1940 | Bryson . |
| 2,243,697 | 5/1941 | Forseberg . |
| 2,259,665 | 10/1941 | Serrell, Jr. . |
| 2,353,983 | 7/1944 | Banning . |
| 2,462,098 | 2/1949 | Hertrich . |
| 2,593,294 | 4/1952 | Goldberg . |
| 2,622,794 | 12/1952 | Smith . |
| 2,727,629 | 12/1955 | Hertrich . |
| 2,733,856 | 2/1956 | Kjellgren . |
| 2,856,072 | 10/1958 | Kronstad . |
| 2,862,659 | 12/1958 | Nyrop . |
| 2,864,499 | 12/1958 | Teuteberg . |
| 2,893,562 | 7/1959 | McPhee et al. . |

(List continued on next page.)

FOREIGN PATENT DOCUMENTS

| | | |
|---|---|---|
| 728009 | 2/1966 | Canada . |
| 758458 | 5/1967 | Canada . |
| 766609 | 9/1967 | Canada . |
| 784032 | 4/1968 | Canada . |
| 787763 | 6/1968 | Canada . |
| 860107 | 1/1971 | Canada . |
| 896673 | 3/1972 | Canada . |
| 953267 | 8/1974 | Canada . |
| 972732 | 8/1975 | Canada . |
| 1069477 | 1/1980 | Canada . |
| 1096829 | 3/1981 | Canada . |
| 1106333 | 8/1981 | Canada . |
| 1132954 | 10/1982 | Canada . |
| 1065333 | 9/1959 | Germany . |
| 1194779 | 6/1965 | Germany . |
| 1272231 | 7/1968 | Germany . |
| 2407833 | 8/1975 | Germany . |
| 260172 | 9/1988 | Germany . |
| 3723864A1 | 1/1989 | Germany . |
| 1194563 | 6/1970 | United Kingdom . |
| 1194505 | 11/1985 | U.S.S.R. . |
| 1327910 | 8/1987 | U.S.S.R. . |

*Primary Examiner*—Frank Spear

*Attorney, Agent, or Firm*—Choate, Hall & Stewart

[57] ABSTRACT

A feed accelerator system for use in a centrifuge, the system comprising an accelerator rotatably mounted substantially concentrically within the centrifuge and including a plurality of disc members concentrically and proximately spaced having a first disc and a second disc, each disc having an inside surface and an outer edge defining a disc diameter. The second disc includes a target surface having no sharp bends or junctions. The first disc includes a disc opening for receiving a discharge opening of a feed pipe. A plurality of disc vanes are disposed between the first and second discs so as to form a plurality of feed channels. The vanes generally extend from a radius equal to or larger than that of the disc opening and of the target surface, and terminate at a radius on the inside surfaces of the first and second discs at a distance from the outer edge of at least one of the first and second discs so as to form a disc smoothener on at least one of the inside surfaces of the first and second discs. A generally cone-shaped apparatus may be attached to the respective outer edges of the first and/or second discs to further smooth the feed slurry so as to produce circumferential flow uniformity of the feed slurry entering the pool of a decanter centrifuge or impinging upon the basket of a pusher centrifuge.

53 Claims, 12 Drawing Sheets

U.S. PATENT DOCUMENTS

| | | | |
|---|---|---|---|
| 3,075,695 | 1/1963 | Ayres . | |
| 3,136,722 | 6/1964 | Gooch . | |
| 3,170,874 | 2/1965 | Iono . | |
| 3,268,078 | 8/1966 | Muggli . | |
| 3,268,083 | 8/1966 | Ruegg . | |
| 3,289,843 | 12/1966 | Nyrop . | |
| 3,301,708 | 1/1967 | Von Rotel . | |
| 3,361,264 | 1/1968 | Quetsch . | |
| 3,365,066 | 1/1968 | Howell . | |
| 3,424,375 | 1/1969 | Maurer . | |
| 3,482,771 | 12/1969 | Thylefors . | |
| 3,483,991 | 12/1969 | Humphrey . | |
| 3,616,992 | 11/1971 | Deacon . | |
| 3,734,398 | 5/1973 | Keith, Jr. et al. . | |
| 3,779,450 | 12/1973 | Shapiro . | |
| 3,794,177 | 2/1974 | Lega et al. . | |
| 3,799,431 | 3/1974 | Lavanchy et al. . | |
| 3,810,347 | 5/1974 | Kartinen . | |
| 3,831,764 | 8/1974 | Humphrey . | |
| 3,915,858 | 10/1975 | Condolios . | |
| 3,937,397 | 2/1976 | Zitke et al. . | |
| 3,963,175 | 6/1976 | Daubman et al. . | |
| 4,173,303 | 11/1979 | Cyphelly . | |
| 4,245,777 | 1/1981 | Lavanchy | 494/43 X |
| 4,262,841 | 4/1981 | Berber et al. . | |
| 4,283,286 | 8/1981 | Wilkesmann . | |
| 4,295,600 | 10/1981 | Saget . | |
| 4,320,007 | 3/1982 | Hultsch et al. . | |
| 4,334,647 | 6/1982 | Taylor | 494/37 |
| 4,427,407 | 1/1984 | Paschedag . | |
| 4,566,873 | 1/1986 | Toda . | |
| 4,753,633 | 6/1988 | Callegari, Sr. et al. . | |
| 4,889,627 | 12/1989 | Hoppe . | |
| 4,978,370 | 12/1990 | Klintenstadt . | |
| 5,031,522 | 7/1991 | Brixel et al. . | |

29
31
33
40
39
43
41
45
55
57
57A

FEED ACCELERATOR SYSTEM INCLUDING ACCELERATOR DISC

BACKGROUND OF THE INVENTION

Conventional sedimentation or filtration systems operating under natural gravity have a limited capacity for separating a fluid/particle or fluid/fluid mixture, otherwise known as a feed slurry, having density differences between the distinct phases of the slurry. Therefore, industrial centrifuges that produce large centrifugal acceleration forces, otherwise known as G-levels, have advantages and thus are commonly used to accomplish separation of the light and heavy phases. Various designs of industrial centrifuges include, for example, the decanter, screen-bowl, basket, and disc centrifuge.

Industrial centrifuges rotate at very high speeds in order to produce large centrifugal acceleration forces. Several problems arise when the feed slurry is introduced into the separation pool of the centrifuge with a linear circumferential speed less than that of the centrifuge bowl.

First, the centrifugal acceleration for separation is not fully realized. The G-level might be only a fraction of what is possible. The G-level is proportional to the square of the effective acceleration efficiency. The latter is defined as the ratio of the actual linear circumferential speed of the feed slurry entering the separation pool to the linear circumferential speed of the rotating surface of the separation pool. For example, if the acceleration efficiency is 50 percent, the G-level is only 25 percent of what might be attained and the rate of separation is correspondingly reduced.

Second, the difference in circumferential linear speed, between the slurry entering the separation pool and the slurry within the separation pool which has been fully accelerated by the rotating conveyor and bowl, leads to undesirable slippage, otherwise known as velocity difference, and this creates turbulence in the slurry lying within the separation pool. Such turbulence results in resuspension of the heavy phase, equivalent to a remixing of the heavy phase material and the lighter phase material.

Third, because a portion of the separation pool is used to accelerate the feed slurry, the useful volume of the separation pool is reduced, and thus the separation efficiency of the centrifuge is lessened.

Fourth, the feed slurry often exits the feed accelerator of the centrifuge in a non-uniform flow pattern, such as in concentrated streams or jets. In a decanter centrifuge, such a non-uniform flow entering the separation pool causes remixing of the light and heavy phases, and thus reduces the separation efficiency of the centrifuge. In basket-type centrifuges, a non-uniform flow incident upon the basket causes ridges and valleys to form in the solids cake. These ridges and valleys act detrimentally upon the deliquoring of the resultant product as well as upon any required washing of the resultant product.

In view of these problems, it is desirable to incorporate feed acceleration enhancements into feed accelerators so that the feed acceleration and separation efficiency of the centrifuge are increased.

SUMMARY OF THE INVENTION

The feed accelerator system of the invention comprises a disc accelerator rotatably mounted substantially concentrically within an industrial centrifuge and including a first disc and a second disc, each disc having an inside surface and an outer edge defining a disc diameter. The first disc includes a disc opening for receiving an end of a generally cylindrical feed pipe disposed within the centrifuge for delivering a feed slurry into the centrifuge. The second disc includes a target surface having no sharp bends or junctions. The feed pipe includes a discharge opening located proximately to the feed pipe end so that the discharge opening is positioned proximately to and faces the target surface of the second disc at a predetermined and appropriate stand-off distance as more fully described herein.

A plurality of disc vanes are disposed between the respective inside surfaces of the first and second discs so as to form a plurality of feed channels. Such disc vanes generally extend from a radius equal to or larger than that of the first disc opening and of the target surface, and terminate at a radius on the inside surfaces of the first and second discs at a distance from the outer edge of at least one of the first and second discs so that the remaining unvaned portion of the inside surface of at least one of the first and second discs forms a disc smoothener. The disc smoothener continues to accelerate the feed slurry by means of viscous forces, but more importantly allows the concentrated streams or jets of feed slurry to smear out circumferentially so as to produce a more circumferentially uniform flow exiting the disc accelerator.

The stand-off distance, feed slurry flow rate, diameter of the feed pipe, starting radius at which the disc vanes extend from the disc opening and target surface, number of disc vanes, and spacing between the inside surfaces of the first and second discs are mutually coordinate, and generally within predetermined and appropriate ranges such as to produce efficient entry into as well as substantially equal flows to each feed channel, thereby promoting maximum feed acceleration efficiency and separation efficiency of the centrifuge.

Additional acceleration and circumferential smoothening of the feed slurry may be achieved by attaching a generally cone-shaped apparatus to the outer edges of the disc accelerator. In the preferred embodiment, the generally cone-shaped apparatus includes a first cone-shaped extension attached to the outside edge of the first disc. In another embodiment, the generally cone-shaped apparatus may also include a second cone-shaped extension attached to the outside edge of the second disc. To provide additional acceleration to the feed slurry, a plurality of extension vanes may be disposed between the inside surfaces of the first and second cone-shaped extensions. The extension vanes terminate at a location prior to the outer edge of the first cone-shaped extension so that the remaining unvaned portion of the inside surface of the first cone-shaped extension forms an extension smoothener which renders the slurry flow more uniform circumferentially as it exits the outer edge of the first cone-shaped extension.

Various disc and extension vane configurations may be used to increase the acceleration efficiency and separation efficiency of the centrifuge. Such configurations include radially extending vanes, forwardly angled vanes, and forwardly curved vanes. Wear resistant inserts may also be provided within the feed channels formed by the vanes so as to decrease the cost of repeated maintenance to the centrifuge.

DESCRIPTION OF THE PREFERRED EMBODIMENT

Figure 1:
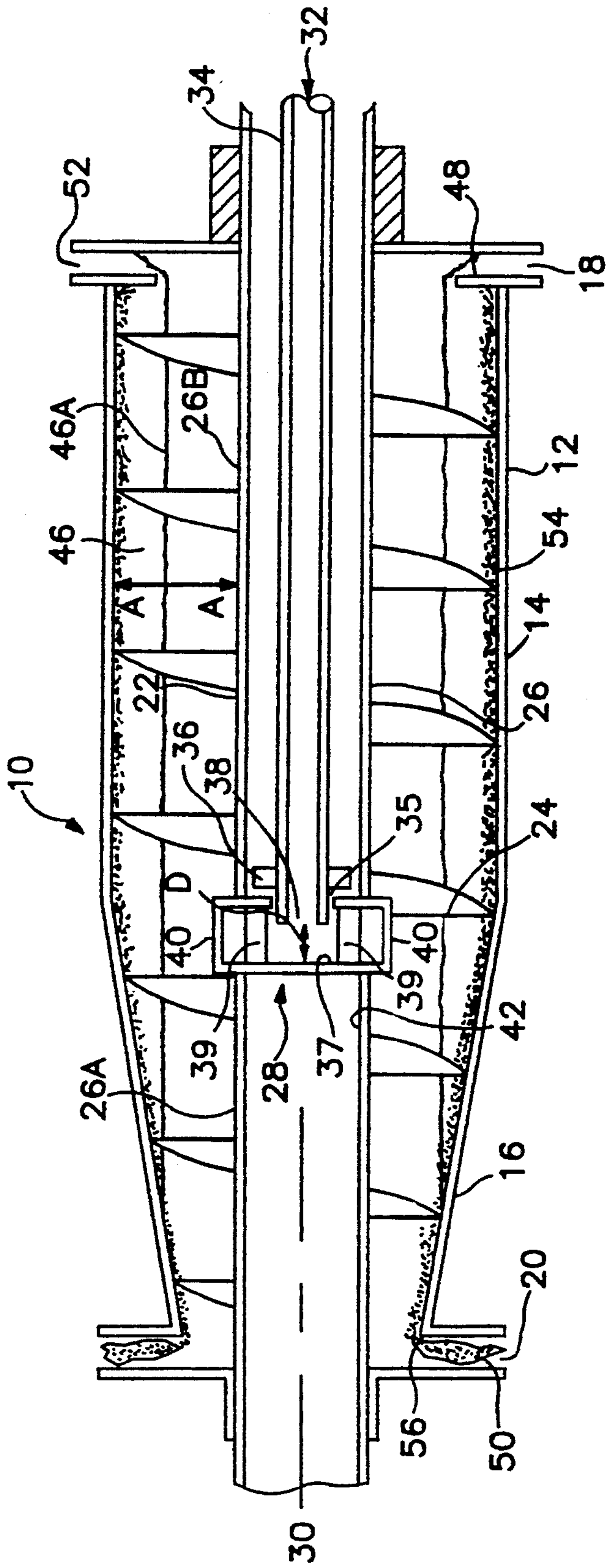
FIG. 1 is a schematic cross-sectional view of a decanter centrifuge including a disc accelerator of the invention.

FIG. 1 shows a schematic cross-sectional view of a decanter centrifuge 10 for separating heavier-phase substances, such as solids, from lighter-phase substances, such as liquids. The centrifuge 10 includes a bowl 12 having a generally cylindrical clarifier section 14 adjacent to a tapered beach section 16, at least one lighter-phase discharge port 18 communicating with the clarifying section 14, and at least one heavier-phase discharge port 20 communicating with the tapered beach section 16. A screw-type conveyor 22 is rotatably mounted substantially concentrically within the bowl 12, and includes a helical blade 24 disposed about a conveyor hub 26 having first and second hub sections 26A and 26B joined by hub ribs 40, and a feed distributor and accelerator disposed between the hub sections 26A and 26B, such as a disc accelerator 28 having a disc opening 35, target surface 37, and disc vanes 39, as more fully described below. The bowl 12 and conveyor 22 rotate at high speeds via a driving mechanism (not shown) but at different angular velocities about an axis of rotation 30.

A feed slurry 32 having, for example, solids 50 suspended in liquid 52, is introduced into the centrifuge 10 through a generally cylindrical feed pipe 34 disposed within the conveyor hub 26 by a mounting apparatus (not shown) at a predetermined and appropriate stand-off distance D from the target surface 37 of the disc accelerator 28. The feed slurry 32, having a determinable flow rate, exits the feed pipe 34 through a discharge opening 38 proximate to and facing the end of the feed pipe 34, engages the target surface 37, and is accelerated by the disc vanes 39 up to substantially the rotational speed, or greater, of the conveyor hub 26.

Figure 2A:
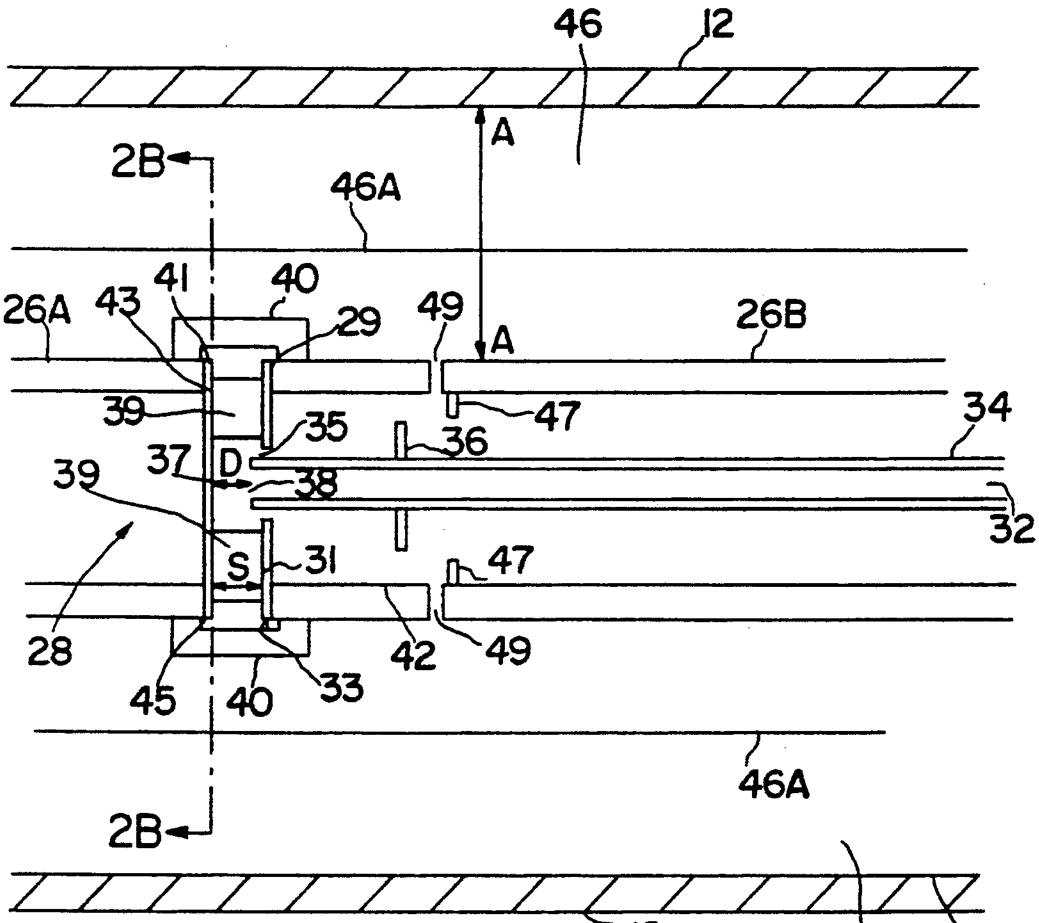
FIG. 2A is an enlarged cross-sectional view of the disc accelerator of FIG. 1.

The feed slurry 32 exits the conveyor hub 26 through the feed channels formed by the disc vanes 39 of the disc accelerator 28, and enters the zone A—A formed between the conveyor hub 26 and the bowl 12. The feed slurry 32 then forms a separation pool 46 having a pool surface 46A, within the zone A—A. FIG. 1 shows that the depth of the separation pool 46 is determined by the radial position of one or more dams 48 proximate to the liquid discharge port 18. As shown in FIG. 2A, a ring-shaped feed pipe baffle 36 is secured to the feed pipe 34 to prevent any feed slurry 32 that may escape the disc accelerator 28 through the disc opening 35 from flowing back along the outside surface of the feed pipe 34. Alternatively, the baffle 36 may be secured to the inside surface 42 of the hub 26. Any such feed slurry 32 engaging the baffle 36 and confined by a ring-shaped leakage dam 47 is directed out of the conveyor hub 26 into the zone A—A through a plurality of leakage drains 49.

The centrifugal force acting within the separation pool 46 causes the suspended solids 50 in the separation pool 46 to sediment on the inner surface 54 of the bowl 12. As shown in FIG. 1, the sedimented solids 50 are conveyed "up" the tapered beach section 16 by the differential rotation speed, with respect to the bowl 12, of helical blade 24 of the conveyor 22, and then pass over a spillover lip 56 proximate to the solids discharge port 20, and exit the centrifuge 10 via the solids discharge port 20. The liquid 52 leaves the centrifuge 10 through the liquid discharge port 18 after flowing over dam(s) 48. Persons skilled in the centrifuge art will appreciate that the separation of heavier-phase substances from lighter-phase substances can be accomplished by other similar devices.

Conventional feed distributors and accelerators do not accelerate the feed slurry 32 to the linear circumferential speed of the separation pool surface 46A, with the consequences of reduced acceleration efficiency and separation efficiency of the centrifuge. Moreover, conventional feed distributors and accelerators often discharge the feed slurry 32 into the separation pool 46 in the form of undesirable concentrated streams or jets. Therefore, it is desirable to equip the feed distributor and accelerator with feed slurry acceleration and circumferential flow uniformity enhancements that result in maximum feed acceleration and separation efficiency. Of particular importance is to select a stand-off distance D of the discharge opening 38 from the target surface 37 so as to maintain, within preselected and appropriate limits, and in coordination with the feed pipe 34 diameter and rate of flow of feed slurry 32, the gravitational droop of the feed slurry 32 exiting the discharge opening 38. It is also important to coordinate the combination of the stand-off distance D, feed slurry 32 flow rate, diameter of the discharge opening 38, starting radius at which the disc vanes 39 extend from disc opening and the target surface 37, number of disc vanes, and spacing S between the inside surfaces of the first and second discs so as to achieve even distribution of the feed slurry 32 into the feed channels formed by the disc vanes 39, and also to substantially reduce the splashback of the feed slurry 32 engaging the target surface 37, and thereby to achieve uniform distribution of the feed slurry into the feed channels, circumferential flow uniformity of the feed slurry, maximum feed acceleration, and maximum separation efficiency of the centrifuge.

FIG. 2A shows an enlarged cross-sectional view of the disc accelerator 28 of FIG. 1 with the helical blade 24 removed for clarity. The disc accelerator 28 is disposed between the first and second hub sections 26A and 26B by a plurality of hub ribs 40 so that the disc accelerator 28 rotates with the conveyor hub 26. The disc accelerator 28 includes a plurality of disc members including a first and second disc 29 and 41, the first disc 29 having an inside surface 31, outer edge 33, and disc opening 35 for receiving the discharge opening 38 of the feed pipe 34. The second disc 41 includes an inside surface 43, outer edge 45, and target surface 37 having no sharp bends or junctions. In the embodiment shown, the target surface 37 is a flat surface perpendicular to the axis of rotation 30 of the centrifuge 10. The inside surfaces 31 and 43 of the first and second discs are spaced apart by a predetermined and appropriate distance S, in accordance with the previously stated considerations.

FIG. 2A shows the first and second discs 29 and 41 as having generally flat inside surfaces 31 and 43. These surfaces are shown as parallel to one another and perpendicular to the axis of rotation 30. Alternatively, the inside surfaces 31 and 43 may not be parallel, or may be parallel to one another, but not perpendicular to the axis of rotation 30. Additional disc configurations include inside surfaces 31 and 43 having a gentle dish-like curvature with no sharp bends or junctions. In another configuration the discs have generally shallow cone-shaped inside surfaces; in this case, it is important that the inside surface 43 have an included angle less than 180 degrees, otherwise poor distribution of feed slurry 32 results.

Figure 2B:
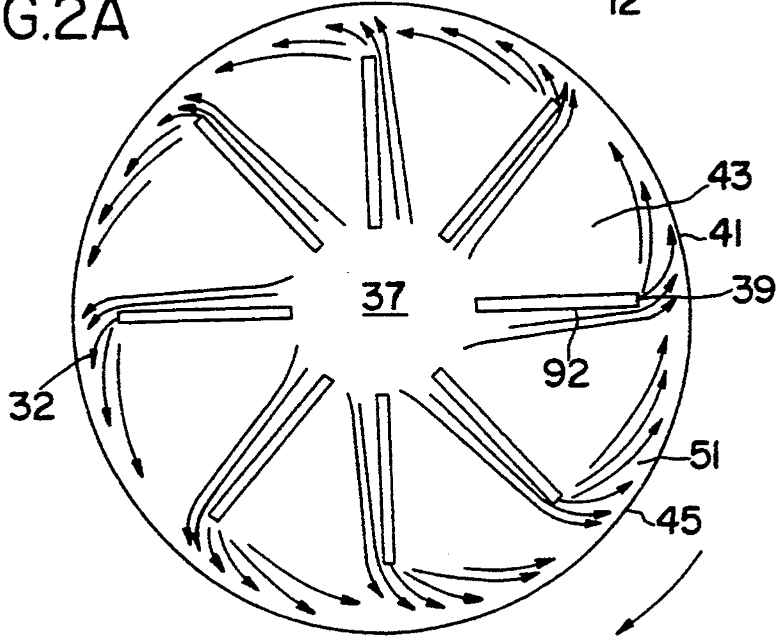
FIG. 2B is an axial view of the disc accelerator of FIG. 2A along line 2B—2B.

A plurality of disc vanes 39 are disposed between the inside surfaces 31 and 43 of the first and second discs 29 and 41 to increase the acceleration of the feed slurry 32 by applying a force to the feed slurry 32 in the direction of rotation of the conveyor hub 26. More specifically, FIG. 2B shows an axial view of the disc accelerator 28, having the first disc 29 removed for clarity and a clockwise direction of rotation. Also shown in FIG. 2B is the flow pattern in the disc accelerator 28 as observed in the rotating reference frame of the accelerator. A leading face 92 of each disc vane 39 applies a circumferential pressure force to the feed slurry 32 so as to increase the tangential velocity of the feed slurry 32 flowing from the target surface 37 to the outer edges 33 and 45 of the first and second discs 29 and 41. Without such disc vanes 39, the feed slurry 32 would obtain its tangential velocity only through the action of relatively weak viscous forces acting at the inside surfaces 31 and 43 of the first and second discs 29 and 41. Such weak viscous forces are not by themselves sufficient to accelerate the feed slurry 32 to the rotational speed of the outer edges 33 and 45, and thus cannot produce a high acceleration efficiency.

Conventional disc accelerators incorporating disc vanes, however, cause the feed slurry 32 to enter the zone A—A in concentrated streams or jets thereby causing, in the separation pool 46, undesirable remixing of the previously separated solids 50 and liquid 52. FIGS. 2A and 2B show that this remixing problem can be eliminated by using disc vanes 39 of such length as to allow the remaining unvaned portions of the inside surfaces 31 and 43 to form a disc smoothener 51. Such a disc smoothener 51 allows the concentrated streams or jets of the feed slurry 32 to smear out circumferentially, as shown by the arrows of FIG. 2B, so as to produce a more uniformly circumferential feed slurry flow exiting the disc accelerator 28.

Figure 3A:
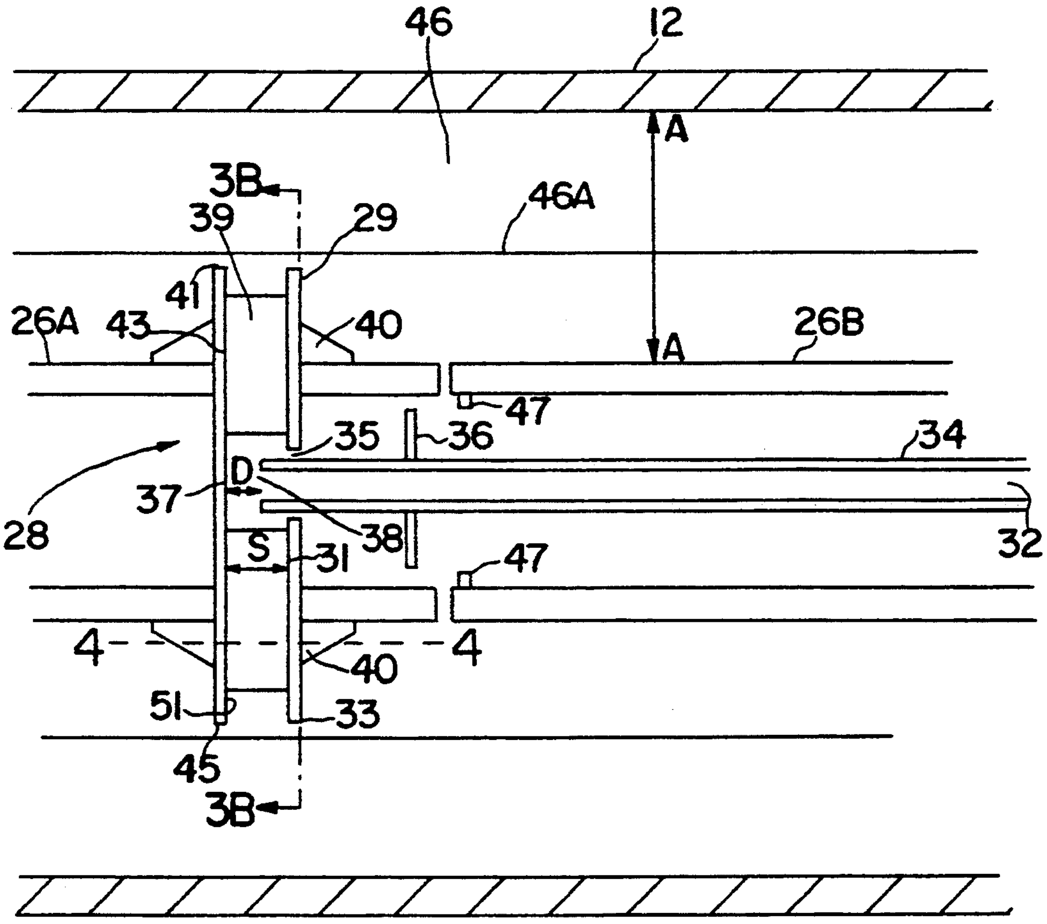
FIG. 3A is a cross-sectional view of another disc accelerator of the invention.
Figure 3B:
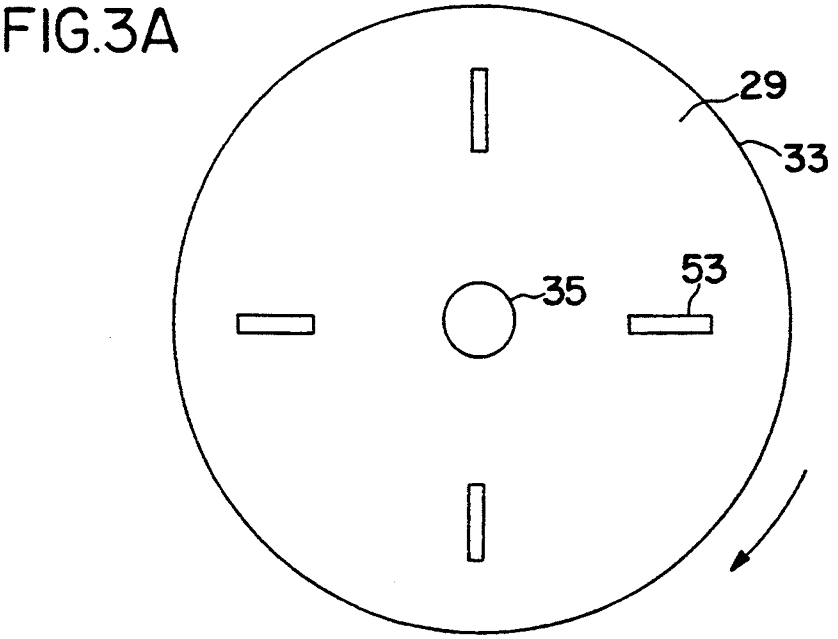
FIG. 3B is an axial view of the disc accelerator in FIG. 3A along line 3B—3B.

Another embodiment of the feed accelerator of the invention is shown in FIG. 3A with the helical blade 24 removed for clarity. In this particular embodiment, each hub rib 40 connecting hub portions 26A and 26B is integral with each disc vane 39. As shown in FIG. 3B, slots 53 are provided in the first disc 29 for receiving the hub ribs 40. Similar slots 53 are provided in the second disc 41. The portion of the hub ribs 40 disposed between the inside surfaces 31 and 43 of the first and second discs 29 and 41 are extended to the desired length of vane 39. FIG. 3A shows the outer edges 33 and 45 of the discs 29 and 41 extending proximately to the surface of the separation pool 46A located in the zone A—A formed by the bowl 12 and the conveyor hub 26. It is understood that the outer edges 33 and 45 of such discs, and the vanes 39, may extend into the separation pool 46. It is understood also that while, for simplicity, FIG. 3B shows four ribs 40 and four disc vanes 39, the number of such ribs and vanes is selected upon considerations of acceleration efficiency and circumferential uniformity.

Figures 4A, 4B, 4C:
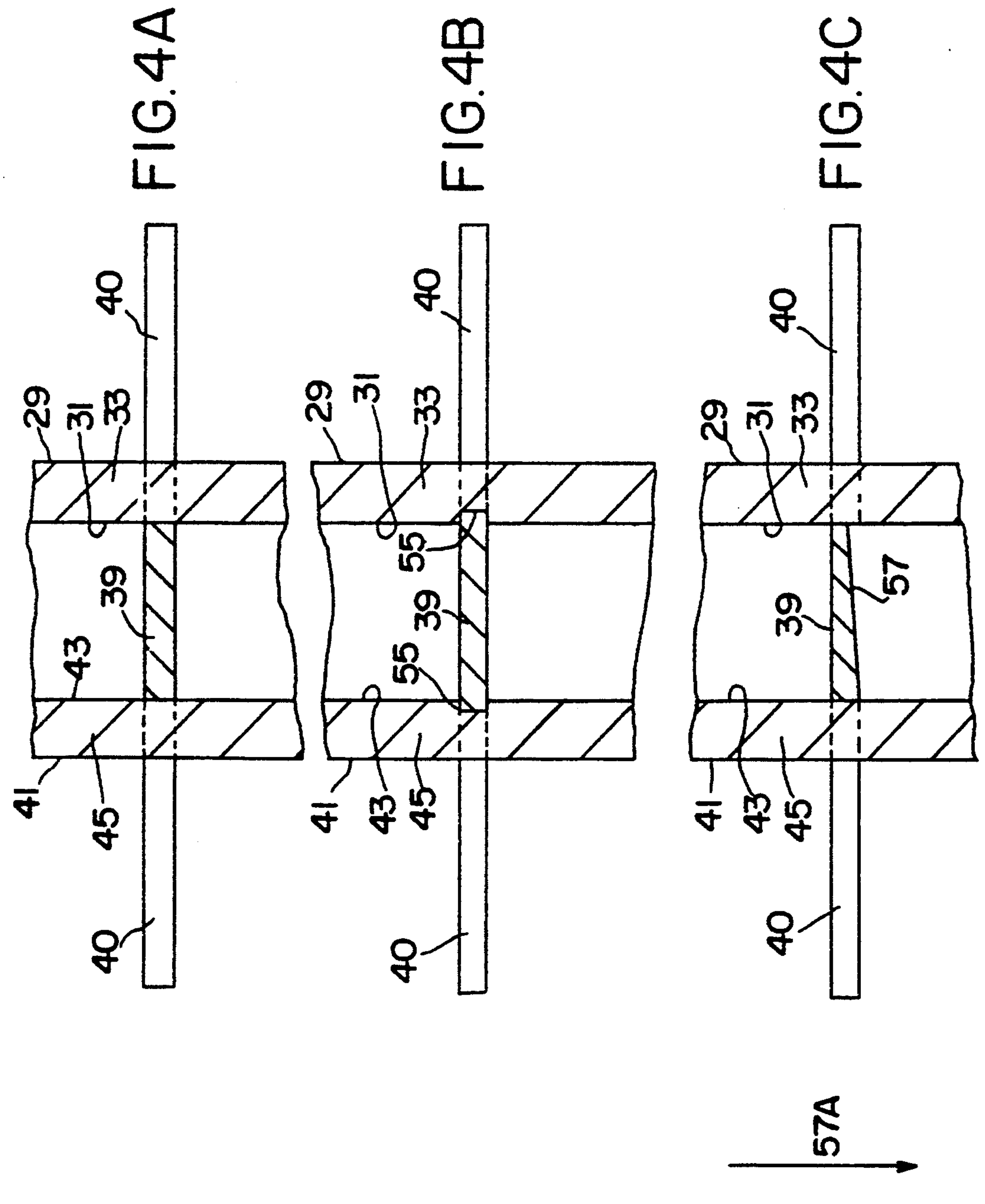
FIG. 4A is an end view of the accelerator of FIG. 3A along line 4—4.
FIG. 4B is an alternative end view of the disc accelerator of FIG. 3A along line 4—4.
FIG. 4C is an alternative end view of the disc accelerator of FIG. 3A along line 4—4.

As shown in FIG. 4A, taken on line 4—4 of FIG. 3A, the disc vane 39 may be secured between the inside surfaces 31 and 43 of discs 29 and 41 by a plurality of tack welds proximate to the outer edges 33 and 43 of such discs. Additionally, as shown in FIG. 4B, guide slots 55 may be formed on the inside surfaces 31 and 43 of the discs 29 and 41 for rigidly securing the vanes 39 between the discs 29 and 41. The smoothing action of the disc smoothener 51 can be further enhanced by slanting the leading edge 57 of the vane 39 which directs the majority of the feed slurry 32 onto the disc smoothener 51 of the first disc 29, as shown in FIG. 4C. It is understood that the leading edge 57 may be slanted so as to direct the feed slurry 32 onto the disc smoothener 51 of the second disc 41. The direction of taper of the leading edge 57 should be related to the direction of rotation (as shown by the arrow 57A) as shown in FIG. 4C. Alternatively, one-half of the leading edge 57 may be slanted toward the disc smoothener 51 of the first disc 29 and one-half of the leading edge 57 may be slanted toward the disc smoothener 51 of the second disc 41.

Figure 5A:
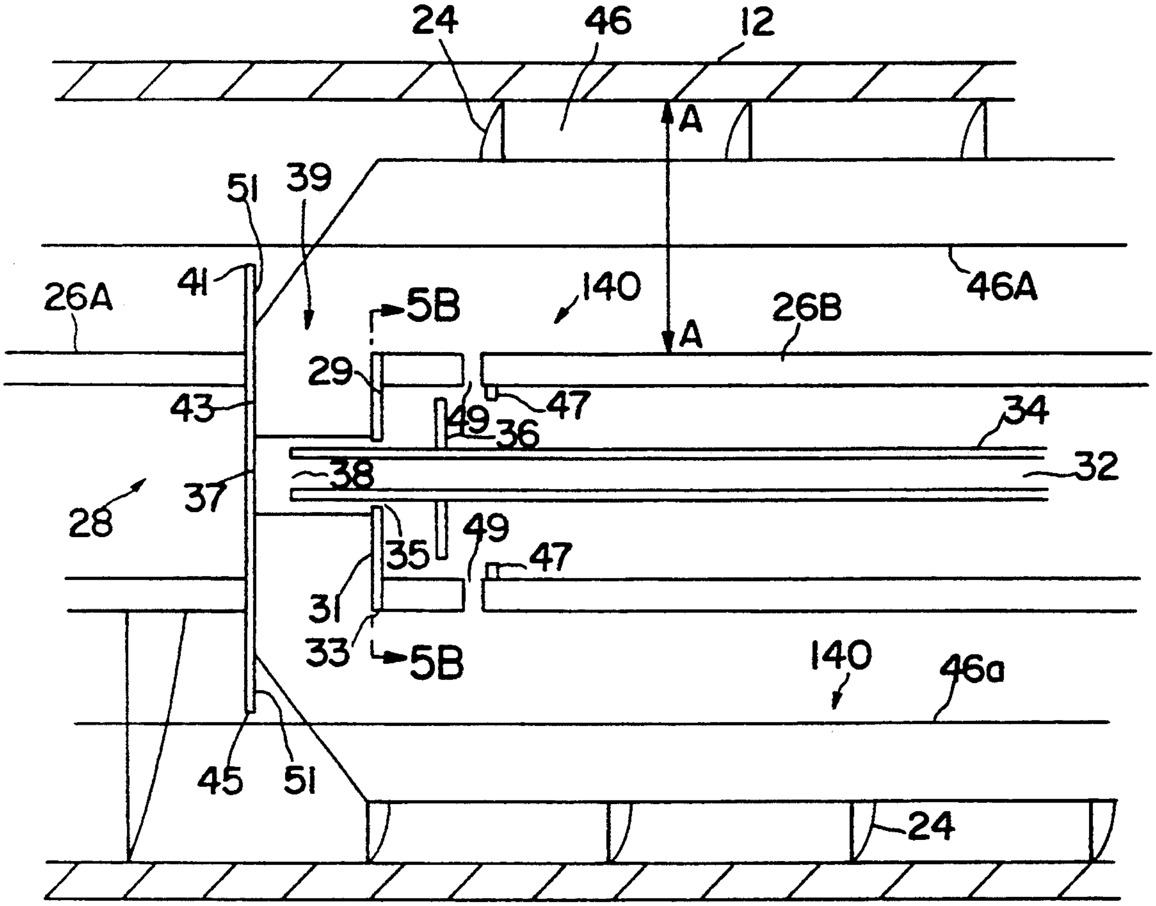
FIG. 5A is a cross-sectional view of another disc accelerator of the invention.
Figure 5B:
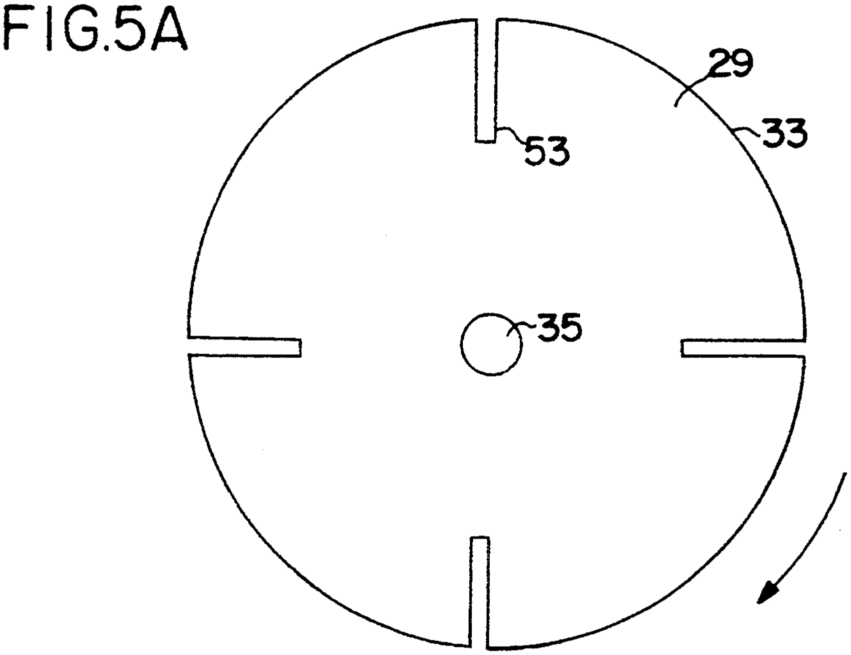
FIG. 5B is an axial view of the disc accelerator of FIG. 5A along line 5B—5B.

The disc accelerator 28 of the invention may also be used in a ribbon-conveyor decanter centrifuge as shown in FIG. 5A. In this embodiment, the longitudinal vanes 140 extend a substantial distance along one of the conveyor hub sections, such as section 26B, and support the helical blade 24. The longitudinal vanes 140 form hub channels (not shown) which extend through a large part of or the entire length of the second hub section 26B. Disc 29 includes slots 53 for accepting longitudinal vanes 140, as shown in FIG. 5B. Similar to the hub ribs 40 of FIG. 3A, those portions of the longitudinal vanes 140 that are disposed between the inside surfaces 31 and

Figure 8:
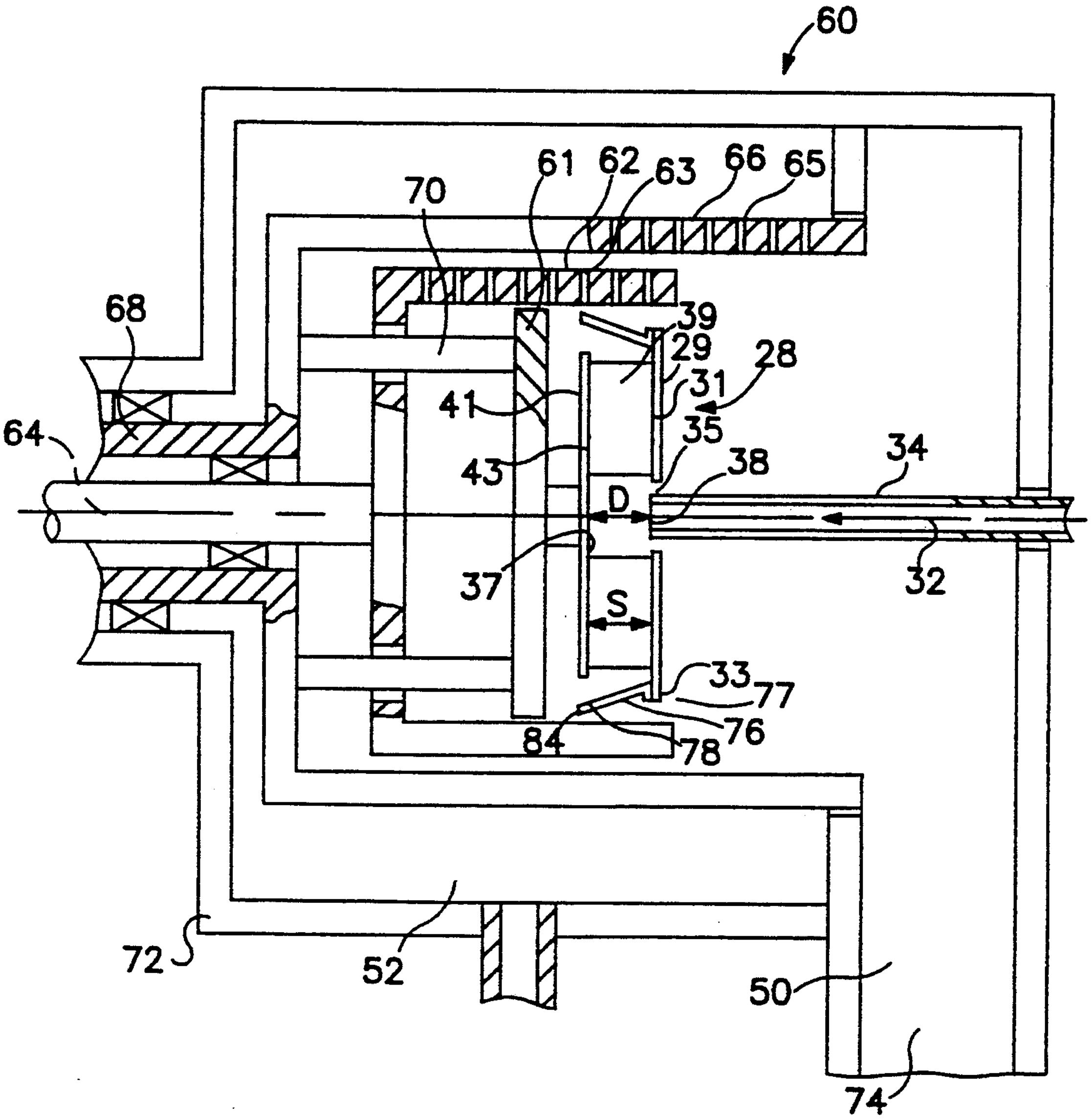
FIG. 8 is a schematic cross-sectional view of a basket centrifuge including another embodiment of the disc accelerator of the invention.

43 of the first and second discs 29 and 41 form the disc vanes 39 and extend outwardly from the disc opening 35 and the target surface 37 to a larger diameter to join the longitudinal vanes 140 which are integral with the disc vanes 39. The unvaned surface 51 of the second disc 41 near the outer edge 45 serves as a smoothener for the feed slurry 32 which is directed toward the second disc 41 by the disc vanes 39 with slanting surface 57 as in FIG. 4C, but with the narrow end of such vane 39 adjacent to disc 41. As more fully described below, a cone-shaped extension 77 as shown in FIG. 8, with an inside surface 78 acting as a smoothener, may be attached to the outer edge 33 of the first disc 29, or to the outer edge 45 of the second disc 41.

Figure 6A:
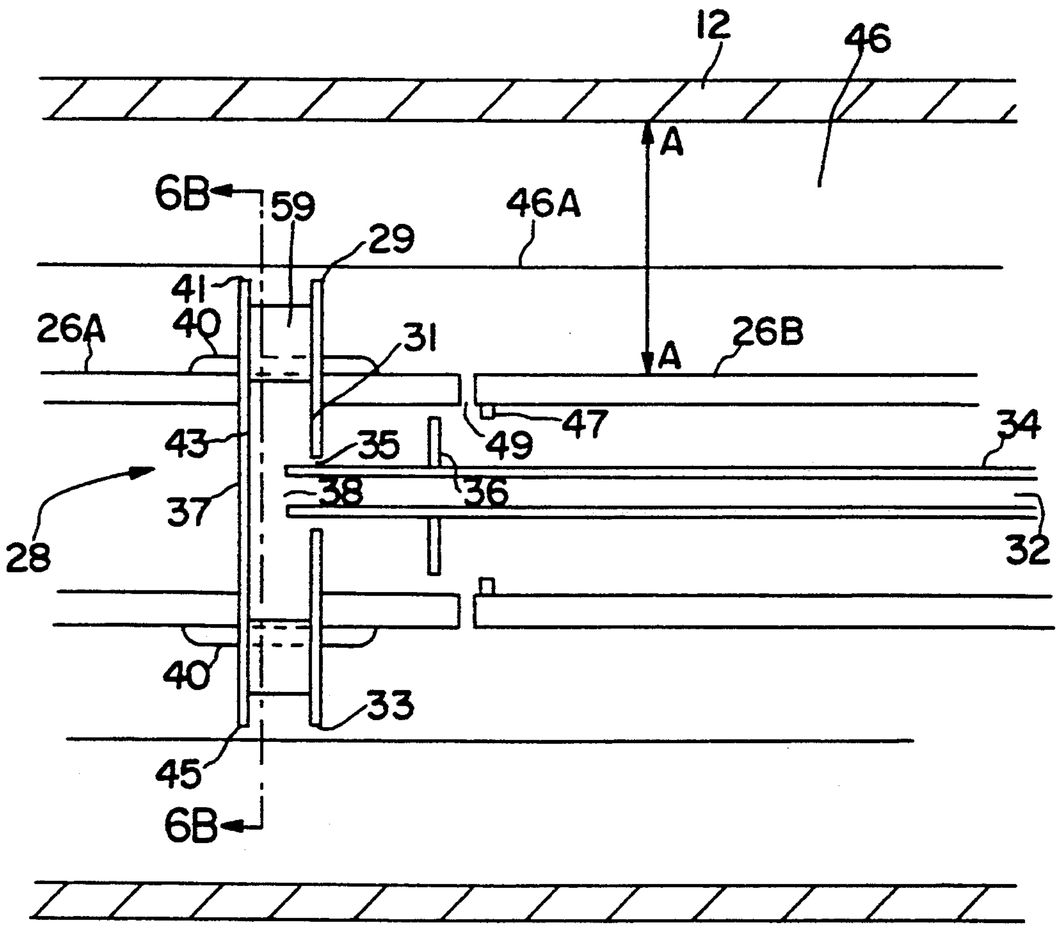
FIG. 6A is a cross-sectional view of another disc accelerator of the invention.
Figure 6B:
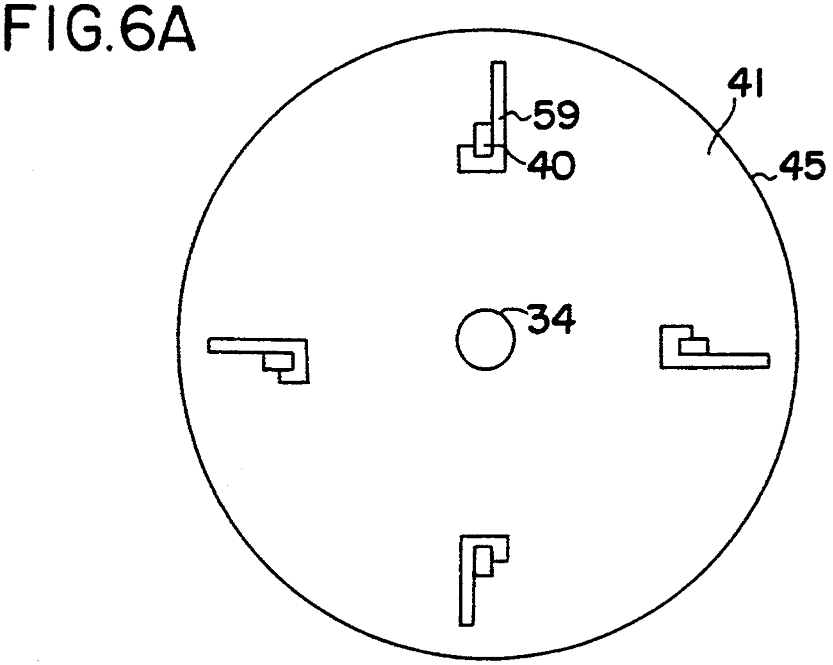
FIG. 6B is an axial view of the disc accelerator of FIG. 6A along line 6B—6B.

FIGS. 6A and 6B show another embodiment of the disc accelerator 28 of the invention including hub ribs 40 connecting hub sections 26A and 26B. Each portion of the hub rib 40 that is disposed between the inside surfaces 31 and 43 of the first and second discs 29 and 41 acts as a frame structure for a removably secured vane attachment 59. The outer ends of the vane attachments 59 may be tack welded to the inside surfaces 31 and 43 of the discs 29 and 41 for purposes of secure positioning. When the vane attachments 59 are to be replaced during maintenance, the tack welds can be ground off and the vane attachments 59 removed from the hub ribs 40. It is understood that such vane attachments 59 may include a wear resistant material. It is also understood that the number of ribs 40 and vane attachments 59 is to be selected on the basis of acceleration efficiency and circumferential uniformity.

Figure 7:
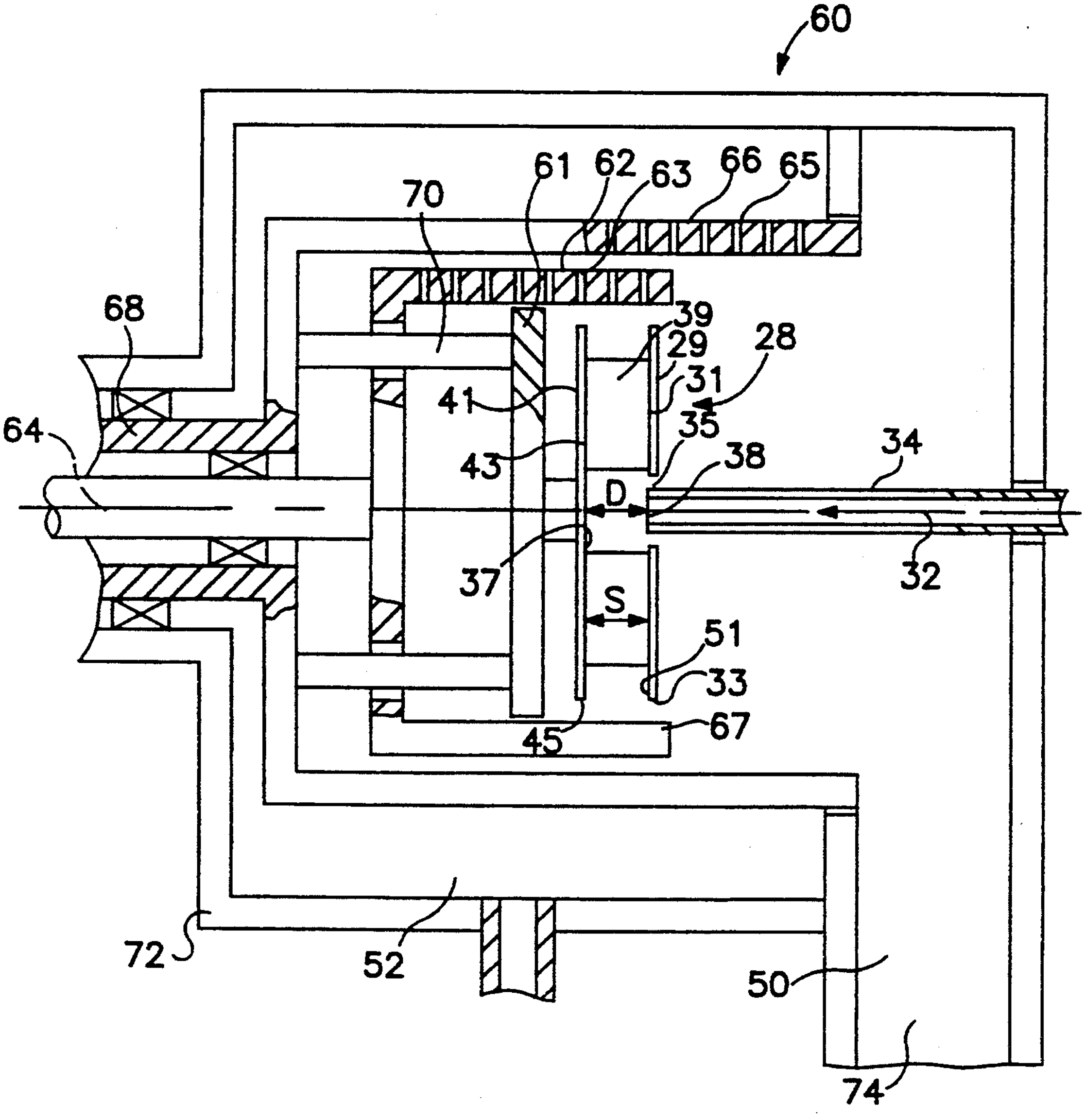
FIG. 7 is a schematic cross-sectional view of a basket centrifuge including a disc accelerator of the invention.

Disc accelerators can also be used in other types of centrifuges, such as the two-stage pusher-type centrifuge 60 of FIG. 7. This centrifuge 60 includes a rotating and reciprocating first-stage basket 62 (mechanism not shown) having perforations 63 for removing separated liquid 52. The basket 62 is rotatably mounted to shaft 64 actuated by a power supply (not shown). The first-stage basket 62 is disposed within a non-reciprocating second-stage basket 66 having perforations 65 for removing additional separated liquid 52. Basket 66 is rotatably mounted to shaft 68 actuated by the power supply. Solids 50 are discharged through a solids discharge chute 74 proximate to the outer edge of the second-stage basket 66. Both the first- and second- stage baskets 62 and 66 are housed within a generally cylindrical housing 72 in which the liquid 52 collects.

Attached to the second-stage basket 66 by struts 70 is a rotating circular plate 61 the outer edge of which acts as a pusher plate for the solids 50 that accumulate on the inside surface of the first-stage basket 62. Attached to the circular plate 61 is a non-reciprocating, rotating disc accelerator 28 similar to that shown in FIG. 2A.

Figure 12A:
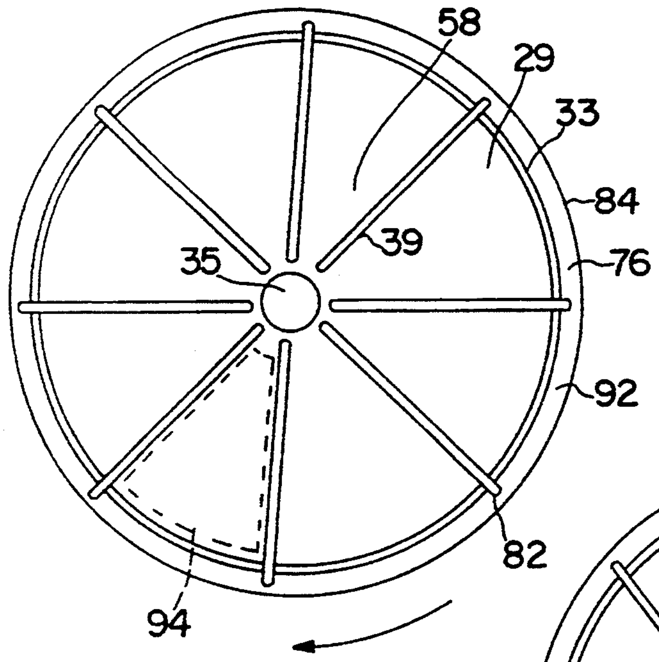
FIG. 12A is an axial view of one embodiment of a disc/extension combination.

A feed pipe 34 having a discharge opening 38 proximate to and facing the distributor surface 37 at a stand-off distance D delivers a feed slurry 32 into the pusher centrifuge 60. After engaging the distributor surface 37, the feed slurry 32 flows into the feed channels 58 formed by the disc vanes 39, as shown in FIG. 12A as more fully described below. The disc vanes 39 accelerate the feed slurry 32 up to a speed substantially equal to or greater than the linear circumferential speed of the outer edges 33 or 45 of the first and second discs 29 and 41.

When the feed slurry 32 enters the region of the disc smoothener 51, the concentrated streams or jets of feed slurry 32 caused by the disc vanes 39 are smeared out into a substantially uniformly circumferential flow pattern. It is understood that the diameter of the first disc 29 may be smaller than the diameter of the second disc 41 so that the disc smoothener 51 is primarily formed on the inside surface 43 of the unvaned portion of the second disc 41. Alternatively, the diameter of the second disc 41 may be smaller than the diameter of the first disc 29 so that the disc smoothener 51 is primarily formed on the unvaned inside surface 31 of the first disc 29.

The feed slurry 32 is deposited onto the inside surface of the first-stage basket 62, where centrifugal force acts to separate the liquid 52 from the solids 50 of the feed slurry 32. A portion of the liquid 52 is removed from the feed slurry 32 through the first-stage basket perforations 63 and is directed into the liquid collection chamber 72. The partially deliquored solids 50 and remaining liquid 52 are then pushed onto the inside surface of the second-stage basket 66 by leftwards translation of the first-stage basket 62, as shown in FIG. 7.

The rotating second-stage basket 66 also applies a centrifugal force to the feed slurry 32, and additional liquid 52 of the feed slurry 32 is removed through perforations 65 and is directed into the liquid collection chamber 72. The outer edge 67 of the reciprocating first-stage basket 62, when it translates rightwards, as shown in FIG. 7 acts as a secondary pusher plate to push the solids 50 collected on the inside surface of the second-stage basket 66 into the solids discharge chute 74 and out of the centrifuge 60.

Circumferential smoothing of the feed slurry 32 exiting the disc accelerator 28 can also be achieved by attaching a generally cone-shaped apparatus 77 to the disc accelerator 28, which cone-shaped apparatus 77, acting either alone or in combination with a disc smoothener 51, produces circumferential smoothing. FIG. 8 shows the preferred embodiment of the generally cone-shaped apparatus 77 including a first generally cone-shaped extension 76 removably attached to the outer edge 33 of the first disc 29. The first cone-shaped extension includes an inside surface 78 and an outer edge 84. The feed slurry 32 exiting the disc accelerator 28 flows onto the inside surface 78 of the first cone-shaped extension 76 and concentrated streams or jets of the feed slurry 32 are smeared out circumferentially by the rotating inside surface 78 before the feed slurry 32 flows onto the inside surface of the first-stage basket 62.

A feed accelerator of the type shown in FIG. 8, was tested in an experimental rig to study the performance of a cone-shaped extension similar to that of the first cone-shaped extension 76. For convenience in the experimental rig, such cone-shaped extension was attached to the second disc 41 and extended toward the first disc 29. It is noted, however, that the performance of the first cone-shaped extension 76 of FIG. 8 is the same as that of the cone-shaped extension used in the experimental rig.

The first disc 29 and second disc 41 each included diameters of 12.0 inches. The inside surface 43 was spaced at an axial distance S of 1.25 inches from the inside surface 31. Sixteen disc vanes 39 were mounted between the first disc 29 and second disc 41. The disc vanes 39 extended from a radius of 3.3 inches, at their inner edges, to a radius of 6.0 inches at their outer edges. The disc vanes 39 were curved as shown in FIG. 12C so that at their outer edges the disc vanes 39 were inclined at an angle of 40 degrees to the radial direction, forwardly from the direction of rotation.

Fastened to second disc 41 was a cone-shaped extension having a half-angle of 24 degrees with respect to the axis of rotation 30 and extending axially from inside surface 43 a distance of 1 inch toward inside surface 31. The feed pipe 34 had an inside diameter of 2.3 inches, and discharge opening 38 was spaced from distributor surface 37 at a stand-off distance D equal to 1.5 inches. The disc accelerator was operated at a rotative speed of approximately 2000 revolutions per minute.

At a feed slurry flow rate of 400 gallons per minute (modelled by water), the disc accelerator 28 produced an acceleration efficiency of 130 percent when the cone-shaped apparatus was not present. When the cone-shaped apparatus was installed into the experimental rig that was operated at the same flow rate of 400 gallons per minute, the acceleration efficiency was determined to be 112 percent. These experimental test results indicate that, although the cone-shaped apparatus is not efficient for purposes of accelerating feed slurry 32, the combination of the cone-shaped apparatus acting as a cone smoothener, together with the forward-curved disc vanes 39 of FIG. 12C installed in disc accelerator 28, produces a combination of a circumferentially uniform feed slurry flow 32 with an acceleration efficiency of 100 percent or greater.

Another experimental test was conducted on a two-stage pusher centrifuge used for dewatering and washing sodium chloride crystals, about 1 to 3 mm in size, in a process where circumferential uniformity of the solids cake exiting the centrifuge was important. The conventional cone-type feed accelerator originally installed in the centrifuge had geometry and dimensions such as to yield a low acceleration efficiency. The conventional cone-type accelerator was replaced by a new feed accelerator consisting of parallel first and second flat discs within which were mounted 32 forwardly curved vanes having a forward discharge angle 39A, as shown in FIG. 12C, of 40 degrees with respect to the radial direction. In addition, a cone smoothener apparatus, similar to the first cone-shaped apparatus 76 of FIG. 8, was attached to the outer edge of the first disc. This new feed accelerator, by virtue of the forward-curved vanes, had a high acceleration efficiency. Observation of the cake on the first basket showed the circumferential distribution to be smooth and uniform, without circumferential ridges and valleys. These observations demonstrated that the configuration of FIG. 8, with forwardly curved vanes as in FIG. 12C, produces a combination of high acceleration efficiency with good circumferential uniformity.

Additional experiments were performed on a pair of two-stage pusher-type centrifuges, each having a solids separation capacity of about four tons per hour, corresponding to a slurry feed rate of about 125 gallons per minute. These were used to dewater sodium bicarbonate crystals having particle sizes ranging from 50 to 150 microns. The first centrifuge included a conventional feed accelerator having a pair of slightly-dished shaped parallel discs, without disc vanes. The second centrifuge was modified in turn with three different modified feed accelerators so that side-by-side tests could be performed against the first centrifuge to investigate the comparative performance of each of the modified feed accelerators. Videotape recordings under stroboscopic lighting were made and study of the videotapes resulted in conclusions of two types: (1) from flow patterns of the feed slurry as it exited from each feed accelerator, the corresponding acceleration efficiency was inferred; (2) from inspections of the solids cake on the baskets, the degree of circumferential uniformity was inferred. The test results were as follows.

1. Conventional Feed Accelerator having parallel slightly dished discs, without disc vanes:

The acceleration efficiency was perceived to be poor. The cake was of good circumferential uniformity.

2. Modified Feed Accelerator #1 having sixteen forward-curved vanes with a forward discharge angle 39A of 40 degrees, and a first cone-shaped apparatus (cone smoothener):

The acceleration efficiency was greater than 100 percent, and the cake solids was of good circumferential uniformity.

3. Modified Feed Accelerator #2 having thirty-two radial disc vanes between parallel discs and a cone smoothener:

The acceleration efficiency was slightly less than 100 percent, and the cake was of good circumferential uniformity.

4. Modified Feed Accelerator #3 having thirty-two radial disc vanes between parallel discs without a cone smoothener:

The acceleration efficiency approached 100 percent, and the distribution of solids cake on the first-stage basket was distinctly non-uniform circumferentially. Indeed, thirty-two sharp and distinct axially-extending ridges and thirty-two axially-extending valleys were observed, distributed in a periodic alternating configuration around the circumference.

The thirty-two valleys and thirty-two ridges, which are highly undesirable with respect to the quality of the crystalline product, and which impede the washing of the product solids to remove unwanted impurities, corresponded to the thirty-two concentrated streams of feed slurry propelled off the feed accelerator by the thirty-two radial vanes.

These experiments demonstrate that when disc vanes are used for the purpose of high acceleration efficiency, a smoothener apparatus is essential to the prevention of a severe degree of circumferential non-uniformity. These test results also show that the combination of forward curved vanes with a cone smoothener results in acceleration efficiencies of 100 percent or greater together with a high degree of circumferential uniformity.

Figure 9:
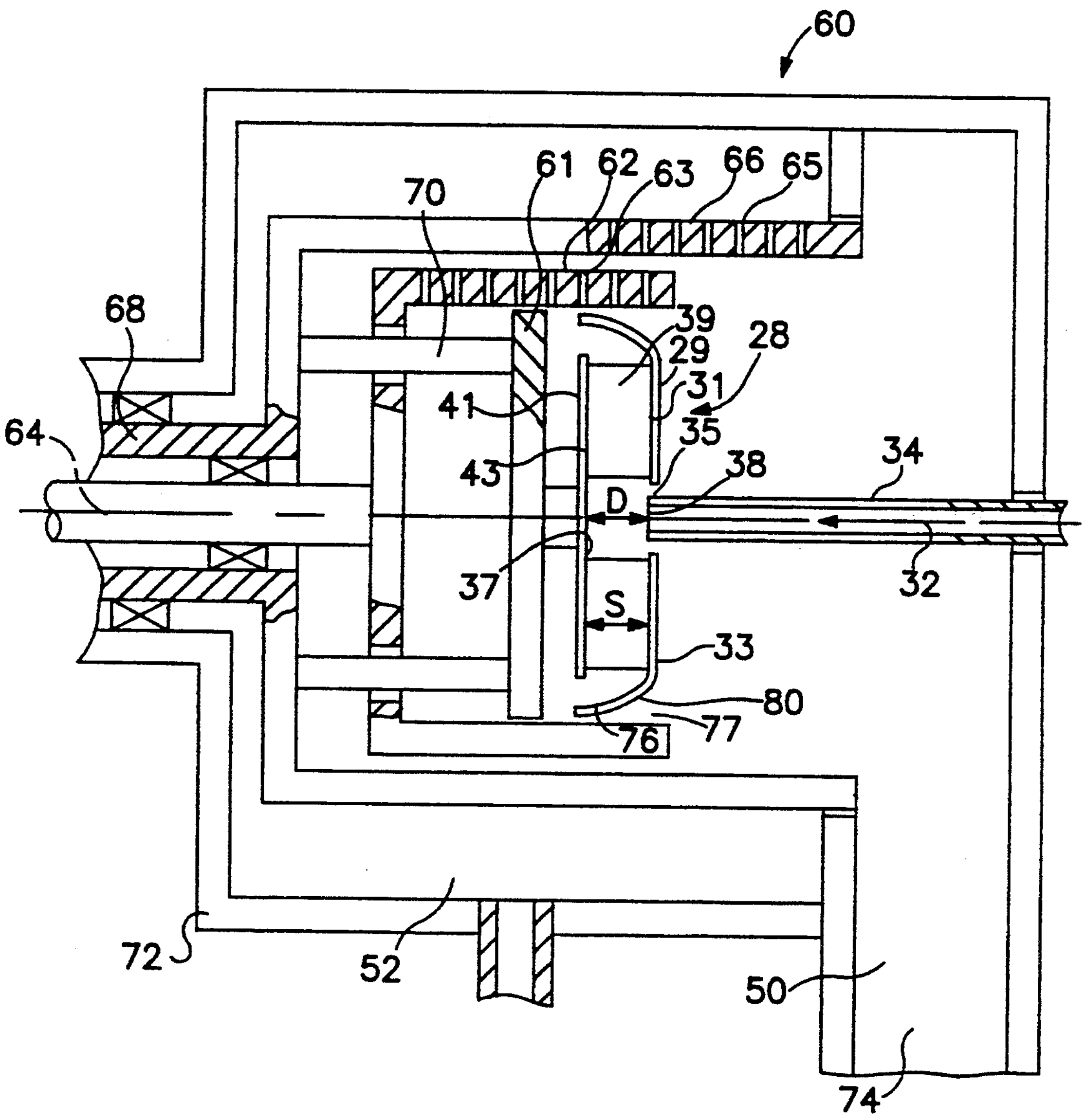
FIG. 9 is a schematic cross-sectional view of a basket centrifuge including another embodiment of the disc accelerator of the invention.

FIG. 9 shows that potential plugging problems of the feed slurry 32 may be avoided by means of an alternative embodiment of the first cone-shaped extension 76 of FIG. 8 wherein the first cone-shaped extension 76 is joined to the outer edge 33 of the first disc 29 by a transition section 80 having no sharp bends or junctions. It is understood that such a curved first cone-shaped extension 76 may be alternatively formed by extending the outer edges 33 of the first disc 29 in a curved configuration.

Figure 10:
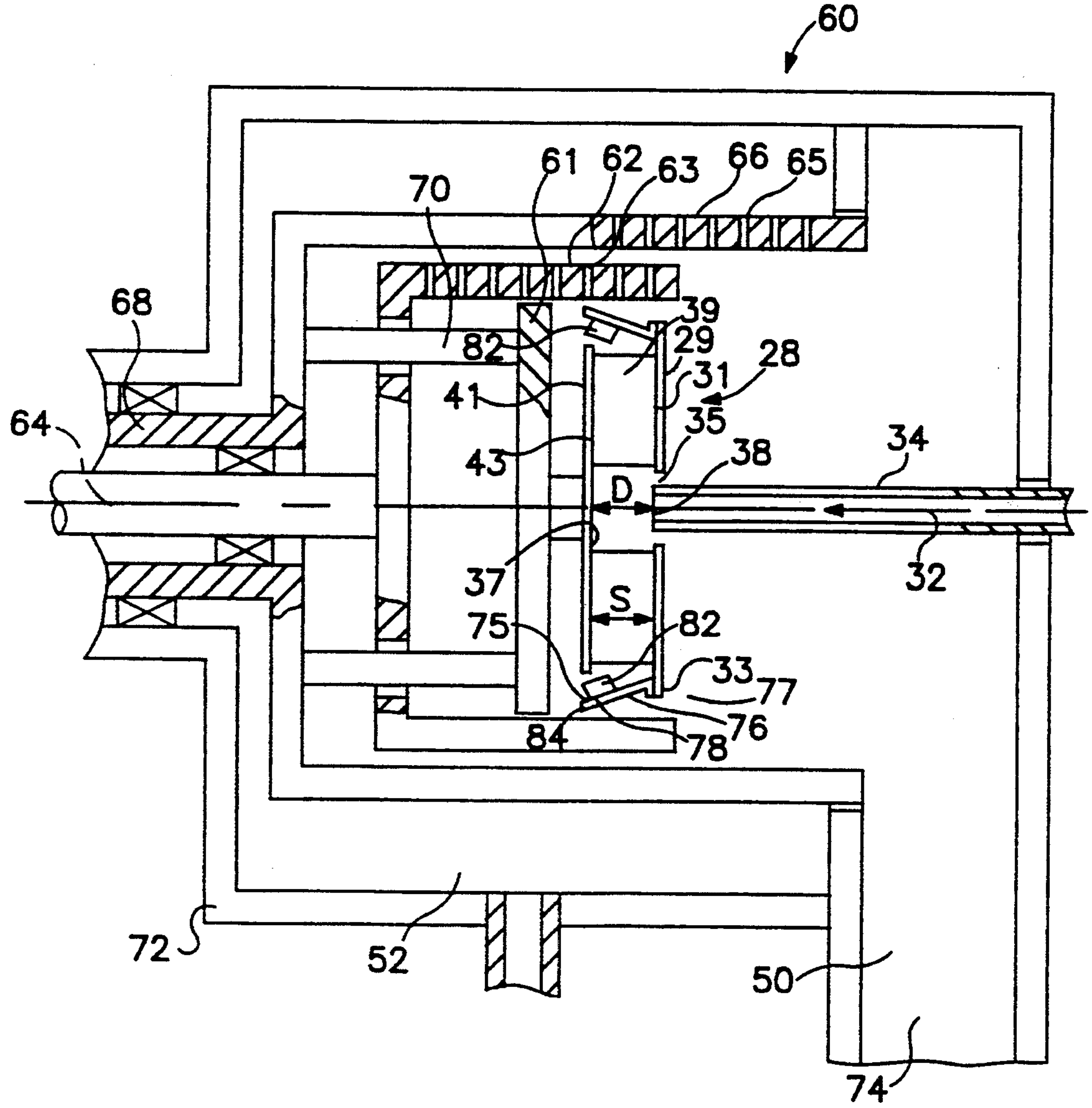
FIG. 10 is a schematic cross-sectional view of a basket centrifuge including another embodiment of the disc accelerator of the invention.

The acceleration of the feed slurry 32 can be further enhanced by attaching extension vanes 82 to the inside surface 78 of the first cone-shaped extension 76, as shown in FIG. 10. The extension vanes 82 impart an additional rotational force on the feed slurry 32 after the slurry 32 exits the disc accelerator 28 so as to further accelerate the feed slurry 32 to or above the rotational speed of the first-stage basket 62. Note that the extension vanes 82 terminate at a location prior to the outer edge 84 of the first cone-shaped extension 76 so that the unvaned portion of the inside surface 78 forms the extension smoothener 75. Each disc vane 39 may be attached to or made integral with an extension vane 82 so as to form a composite accelerator vane.

Figure 11:
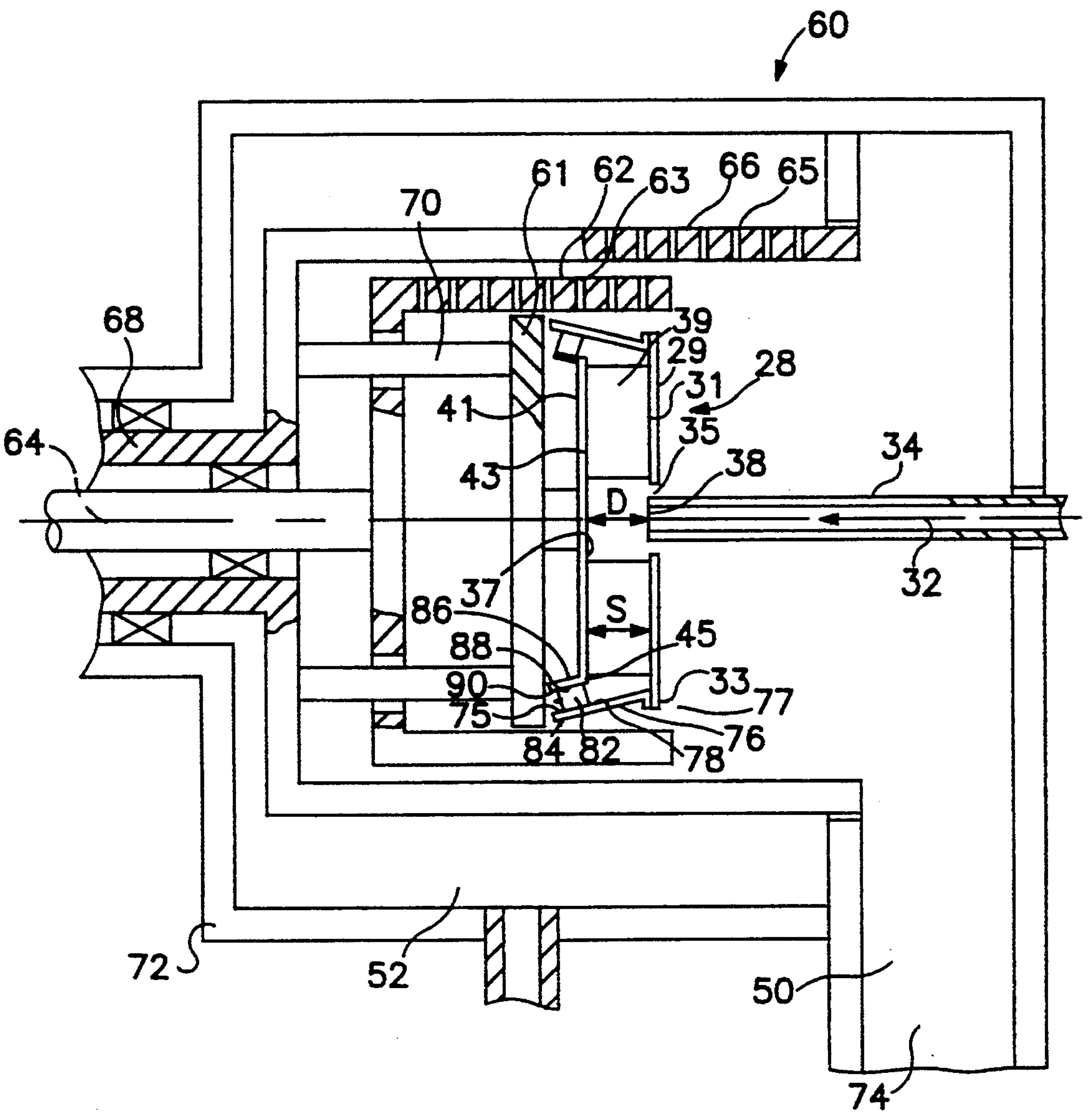
FIG. 11 is a schematic cross-sectional view of a basket centrifuge including another embodiment of the disc accelerator of the invention.

FIG. 11 shows another embodiment of the cone-shaped apparatus 77 further including a second cone-shaped extension 86 removably attached to the outer edge 45 of the second disc 41, the second cone-shaped extension 86 having an inside surface 88 and an outer edge 90. Alternatively the second cone-shaped extension 86 may be joined to the second disc outer edge 45 by a transition section having no sharp bends or junctions, or may be a curved extension of the outer edge 45 of the second disc 41. The extension vanes 82 are disposed between the inside surfaces 78 and 88 of the first and second cone-shaped extensions 76 and 86 to provide additional acceleration of the feed slurry 32. FIG. 11 shows an extension smoothener 75 formed on the inside surface 78 of the first cone-shaped extension 78. It is understood that the extension vanes 82 may also terminate prior to the outer edge 90 of the second cone-shaped extension 86 so as to form the extension smoothener 75 on the unvaned inside surface 88 of the second cone-shaped extension 86.

Various configurations of the disc and extension vanes 39 and 82 enhance the acceleration of the feed slurry 32 so that the feed slurry exits the accelerator 28 at a linear circumferential speed greater than the linear circumferential speed of the pool surface 46A. It is noted that the configurations of disc vane 39 discussed below may also be incorporated into the disc accelerator configurations shown in FIGS. 7, 8, 9, and 10, and may also be used in any type of centrifuge, such as the decanter and ribbon-conveyor centrifuges previously discussed. FIG. 12A shows an axial view of a disc accelerator 28 similar to that of FIG. 11 with the disc vanes 39 integral with the extension vanes 82 and the second cone-shaped extension 86 and second disc 41 removed for clarity. A plurality of disc vanes 39 radially extending from proximately the disc opening 35 to the outer edge 33 of the first disc 29 form a plurality of wedge-shaped feed channels 58. A plurality of extension vanes 82 radially extending from the outer edge 33 of the first disc 29 and the ends of the disc vanes 39 to a location prior to the outer edge 84 of the first cone-shaped extension 76 form a plurality of wedge-shaped extension feed channels 92.

Figure 12B:
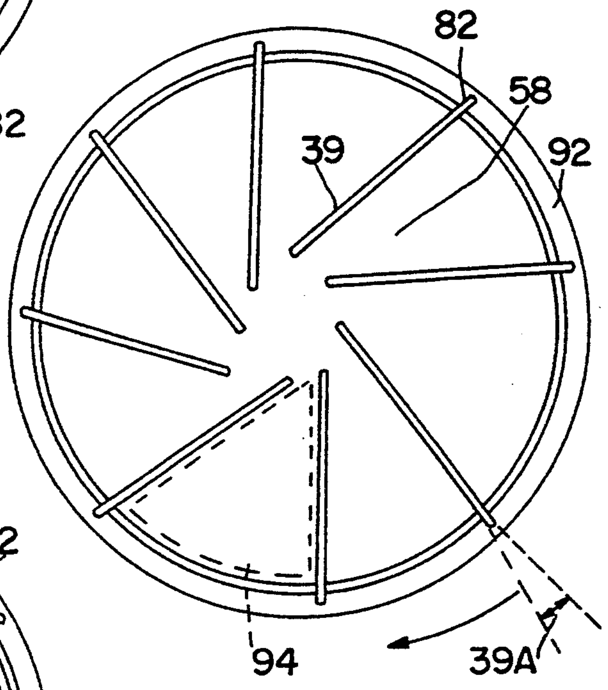
FIG. 12B is an axial view of another embodiment of a disc/extension combination.
Figure 12C:
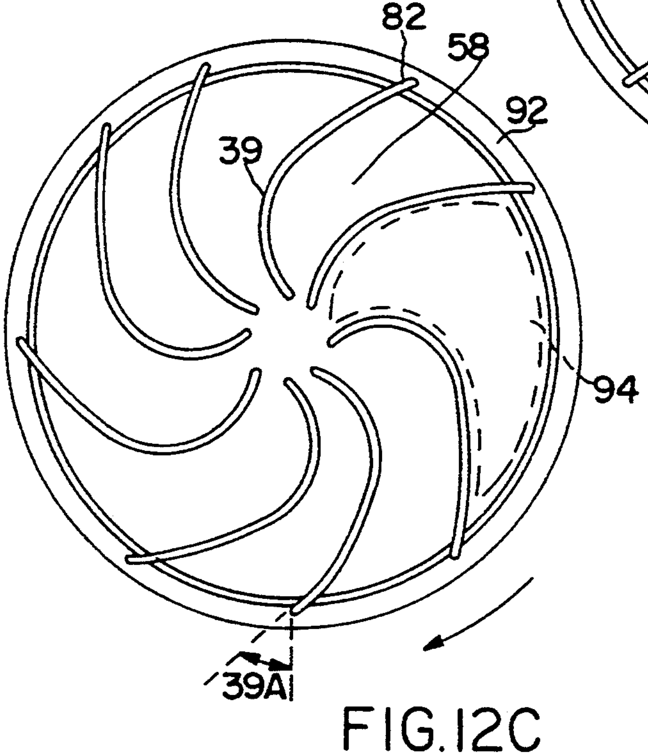
FIG. 12C is an axial view of another embodiment of a disc/extension combination.

Feed slurry acceleration efficiency greater than 100% may be achieved by positioning the disc vanes 39 and the extension vanes 82 at an angle 39A in the direction of rotation as shown in FIG. 12B. In this configuration, the disc vanes 39 form forwardly angled feed channels 58 and forwardly angled extension feed channels 92. Alternatively, the disc and extension vanes 39 and 82 may be curved at an angle 39A in the direction of rotation as shown in FIG. 12C to form a plurality of forwardly curved feed channels 58 and a plurality of forwardly curved extension feed channels 92. Wear resistant inserts 94 corresponding to the shape of the feed channels 58 and the extension feed channels 92 may be used to decrease the cost of repeated maintenance to the centrifuge.

FIGS. 12A, 12B, and 12C show the disc and extension vanes 39 and 82 perpendicularly attached to the respective inside surfaces 31 and 78 of the first disc 29 and the first cone-shaped extension 76. Further acceleration may be achieved by attaching the disc and extension vanes 39 and 82 at an angle to the inside surfaces 31 and 78 in the direction of rotation.

What is claimed is:

1. A feed accelerator system for use in a centrifuge, the system comprising an accelerator rotatably mounted substantially concentrically within the centrifuge and including a plurality of disc members concentrically and proximately spaced having a first disc and a second disc, each disc having an inside surface and an outer edge defining a disc diameter, wherein the second disc includes a target surface having no sharp bends or junctions, and the first disc includes a disc opening for receiving an end of a generally cylindrical feed pipe disposed within the centrifuge for delivering a feed slurry having a determinable flow rate to the accelerator, the feed pipe having at least one discharge opening located proximately to the feed pipe end so that the discharge opening is positioned proximately to and faces the target surface at a stand-off distance, and a plurality of disc vanes are disposed between the respective inside surfaces of the first and second discs so as to form a plurality of feed channels, the disc vanes generally extending from a radius equal to or larger than that of the disc opening and of the target surface, and terminating at a radius on the inside surfaces of the first and second discs at a distance from the outer edge of at least one of the first and second discs so that an unvaned inside surface of at least one of the first and second discs forms a disc smoothener, wherein the stand-off distance, feed slurry flow rate, diameter of the feed pipe, starting radius at which the disc vanes extend from the disc opening and target surface, number of disc vanes, and spacing between the inside surfaces of the first and second discs are mutually coordinate and generally within predetermined and appropriate ranges so that such variables may be selected to achieve minimum splash-back of the feed slurry engaging the target surface, uniform distribution of the feed slurry into the feed channels, circumferential flow uniformity of the feed slurry, maximum acceleration of the feed slurry, and maximum separation efficiency of the centrifuge.

2. The feed accelerator system of claim 1 wherein the diameter of the first disc is smaller than the diameter of the second disc, and the plurality of disc vanes terminate on the inside surface of the first disc at the outer edge of the first disc and at a radius on the inside surface of the second disc prior to the outer edge of the second disc so that the unvaned inside surface of the second disc forms the disc smoothener.

3. The feed accelerator system of claim 1 wherein the diameter of the second disc is smaller than the diameter of the first disc, and the plurality of disc vanes terminate on the inside surface of the second disc at the outer edge of the second disc and at a radius on the inside surface of the first disc prior to the outer edge of the first disc so that the unvaned inside surface of the first disc forms the disc smoothener.

4. The feed accelerator system of claim 1 further including a generally cone-shaped apparatus comprising a first generally cone-shaped extension secured to the outer edge of the first disc, the first generally cone-shaped extension including an inside surface and an outer edge.

5. The feed accelerator system of claim 4 wherein the generally cone-shaped apparatus further includes a second generally cone-shaped extension secured to the outer edge of the second disc, the second generally cone-shaped extension including an inside surface and an outside edge.

6. The feed accelerator system of claim 4 wherein a plurality of extension vanes are disposed on the inside surface of the first cone-shaped extension so as to form a plurality of extension feed channels, the extension vanes generally extending proximately from the outer edge of the first disc to a location on the inside surface of the first cone-shaped extension proximately to the outer edge of the first cone-shaped extension.

7. The feed accelerator system of claim 6 wherein the extension vanes terminate on the inside surface of the first cone-shaped extension at a location prior to the outer edge of the first cone-shaped extension so that an unvaned inside surface of the first cone-shaped extension forms an extension smoothener.

8. The feed accelerator system of claim 5 wherein a plurality of extension vanes are disposed between the respective inside surfaces of the first and second cone-shaped extensions so as to form a plurality of extension feed channels, the extension vanes generally extending proximately from the outer edges of the first and second discs and terminating at a location on the inside surfaces of the first and second cone-shaped extensions proximately to the outer edges of the first and second cone-shaped extensions.

9. The feed accelerator system of claim 8 wherein the extension vanes terminate at a location prior to the outer edges of the first and second cone-shaped extensions so that unvaned inside surfaces of the first and second cone-shaped sections form an extension smoothener.

10. The feed accelerator system of claim 6, 7, 8, or 9 wherein each disc vane communicates with one extension vane so as to form a continuous accelerator vane.

11. The feed accelerator system of claim 4 wherein the first generally cone-shaped extension is removably secured to the first disc by a fastening apparatus.

12. The feed accelerator system of claim 5 wherein the second generally cone-shaped extension is removably secured to the second disc by a fastening apparatus.

13. The feed accelerator system of claim 4 wherein a transition section having no sharp bends or junctions joins the first generally cone-shaped extension to the outer edge of the first disc.

14. The feed accelerator system of claim 5 wherein a transition section having no sharp bends or junctions joins the second generally cone-shaped extension to the outer edge of the second disc.

15. A feed accelerator system for use in a centrifuge, the system comprising a conveyor hub rotatably mounted substantially concentrically within a rotating bowl, the conveyor hub including at least two hub sections adjacently spaced and joined by a plurality of hub ribs secured to each of the two hub sections, and an accelerator including a plurality of disc members concentrically and proximately spaced having a first disc and a second disc, each disc including an inside surface and an outer edge defining a disc diameter, wherein the accelerator is disposed between the two hub sections so that the accelerator rotates with the conveyor hub, the second disc includes a target surface without sharp bends or junctions, and the first disc includes a disc opening for receiving an end of a generally cylindrical feed pipe disposed within the centrifuge for delivering a feed slurry having a determinable flow rate to the accelerator, the feed pipe having at least one discharge opening located proximately to the feed pipe end so that the discharge opening is positioned proximately to and faces the target surface at a stand-off distance, and a plurality of disc vanes are disposed between the inside surfaces of the first and second discs so as to form a plurality of feed channels, the vanes generally extending from a radius equal to or larger than that of the disc opening and of the target surface, and terminating at a radius on the inside surfaces of the first and second discs at a distance from the outside edge of at least one of the first and second discs so that the unvaned inside surface of at least one of the first and second discs forms a disc smoothener.

16. The feed accelerator system of claim 15 wherein the stand-off distance, feed slurry flow rate, diameter of the feed pipe, starting radius at which the disc vanes extend from the disc opening and target surface, number of disc vanes, and spacing between the inside surfaces of the first and second discs are mutually coordinated and generally within predetermined and approximate ranges so that such variables may be selected to achieve minimum splashback of the feed slurry engaging the target surface, uniform distribution of the feed slurry into the feed channels, circumferential flow uniformity of the feed slurry, maximum acceleration of the feed slurry, and maximum separation efficiency of the centrifuge.

17. The feed accelerator system of claim 15 wherein the hub ribs are approximately parallel to the axis of rotation of the conveyor hub, extend a substantial distance along one of the conveyor hub sections, and support at least one helical ribbon blade.

18. The feed accelerator system of claim 15 wherein the disc vanes terminate at a radius on the inside surfaces of the first and second discs at a distance from the outer edges of the first and second discs so that the unvaned portions of the inside surfaces of the discs form a disc smoothener.

19. The feed accelerator system of claim 15 wherein each disc member includes a plurality of disc slots for receiving a hub rib so that a portion of each hub rib is disposed between the inside surfaces of the first and second discs.

20. The feed accelerator system of claim 19 wherein each disc vane is integral with a corresponding hub rib and is a lateral extension of the hub rib.

21. The feed accelerator system of claim 19 wherein the disc vanes are removably secured to the portions of the hub ribs disposed between the first and second discs.

22. The feed accelerator system of claim 1 or 15 wherein the inside surface of the first disc includes a gentle curvature having no sharp bends or junctions.

23. The feed accelerator system of claim 1 or 15 wherein
the inside surface of the second disc includes a gentle curvature having no sharp bends or junctions.

24. The feed accelerator system of claim 1 or 15 wherein
the inside surface of the first disc is a generally shallow cone-shaped member.

25. The feed accelerator system of claim 1 or 15 wherein
the inside surface of the second disc is a generally shallow cone-shaped member having an included angle less than 180 degrees.

26. The feed accelerator system of claim 1 or 15 wherein
the disc vanes are disposed perpendicularly to the inside surfaces of the first and second discs and extend radially so as to form a plurality of wedge-shaped feed channels.

27. The feed accelerator system of claim 1 or 15 wherein
the disc vanes are disposed at an angle to the inside surfaces of the first and second discs and extend radially so as to form a plurality of wedge-shaped feed channels.

28. The feed accelerator system of claim 1 or 15 wherein
the disc vanes are disposed perpendicularly to the inside surfaces of the first and second discs and are forwardly curved in the direction of rotation of the accelerator so as to form a plurality of curved feed channels.

29. The feed accelerator system of claim 1 or 15 wherein
the disc vanes are disposed at an angle to the inside surfaces of the first and second discs and are forwardly curved in the direction of rotation of the accelerator so as to form a plurality of curved feed channels.

30. The feed accelerator system of claim 1 or 15 wherein
the disc vanes are disposed perpendicularly to the inside surfaces of the first and second discs and are forwardly angled in the direction of rotation of the accelerator so as to form a plurality of angled feed channels.

31. The feed accelerator system of claim 1 or 15 wherein
the disc vanes are disposed at an angle to the inside surfaces of the first and second discs and are forwardly angled in the direction of rotation of the accelerator so as to form a plurality of angled feed channels.

32. The feed accelerator system of claim 1 or 15 wherein
each feed channel includes a removable wear resistant insert corresponding to the shape of the feed channel.

33. The feed accelerator system of claim 6 wherein
the extension vanes are disposed perpendicularly to the inside surface of the first cone-shaped extension and extend radially and axially outward along the inside surface of the first cone-shaped extension so as to form a plurality of wedge-shaped extension feed channels.

34. The feed accelerator system of claim 6 wherein
the extension vanes are disposed at an angle to the inside surface of the first cone-shaped extension and extend radially and axially outwardly along the inside surface of the first cone-shaped extension so as to form a plurality of wedge-shaped extension feed channels.

35. The feed accelerator system of claim 6 wherein
the extension vanes are disposed perpendicularly to the inside surface of the first cone-shaped extension and are forwardly curved in the direction of rotation of the accelerator so as to form a plurality of curved extension feed channels.

36. The feed accelerator system of claim 6 wherein
the extension vanes are disposed at an angle to the inside surface of the first cone-shaped extension and are forwardly curved in the direction of rotation of the accelerator so as to form a plurality of curved extension feed channels.

37. The feed accelerator system of claim 6 wherein
the extension vanes are disposed perpendicularly to the inside surface of the first cone-shaped extension and are forwardly angled in the direction of rotation of the accelerator so as to form a plurality of angled extension feed channels.

38. The feed accelerator system of claim 6 wherein
the extension vanes are disposed at an angle to the inside surface of the first cone-shaped extension and are forwardly angled in the direction of rotation of the accelerator so as to form a plurality of angled extension feed channels.

39. The feed accelerator system of claim 8 wherein
the extension vanes are disposed perpendicularly to the inside surfaces of the first and second cone-shaped extensions and extend radially and axially outward along the inside surfaces of the first and second cone-shaped extensions so as to form a plurality of wedge-shaped extension feed channels.

40. The feed accelerator system of claim 8 wherein
the extension vanes are disposed at an angle to the inside surfaces of the first and second cone-shaped extensions and extend radially and axially outward along the inside surfaces of the first and second cone-shaped extensions so as to form a plurality of wedge-shaped extension feed channels.

41. The feed accelerator system of claim 8 wherein
the extension vanes are disposed perpendicularly to the inside surfaces of the first and second cone-shaped extensions and are forwardly curved in the direction of rotation of the accelerator so as to form a plurality of curved extension feed channels.

42. The feed accelerator system of claim 8 wherein
the extension vanes are disposed at an angle to the inside surfaces of the first and second cone-shaped extensions and are forwardly curved in the direction of rotation of the accelerator so as to form a plurality of curved extension feed channels.

43. The feed accelerator system of claim 8 wherein
the extension vanes are disposed perpendicularly to the inside surfaces of the first and second cone-shaped extensions and are forwardly angled in the direction of rotation of the accelerator so as to form a plurality of angled extension feed channels.

44. The feed accelerator system of claim 8 wherein
the extension vanes are disposed at an angle to the inside surfaces of the first and second cone-shaped extensions and are forwardly angled in the direction of rotation of the accelerator so as to form a plurality of angled extension feed channels.

45. The feed accelerator system of claim 6 or 8 wherein each extension feed channel includes a removable wear resistant insert corresponding to the shape of the extension feed channel.

46. The feed accelerator system of claim 1 or 15 wherein a stationary baffle is secured to the feed pipe.

47. The feed accelerator system of claim 1 or 15 wherein the stand-off distance, the feed slurry flow rate, and the diameter of the feed pipe are selected so as to maintain, within a preselected and appropriate range, gravitational droop of the feed slurry exiting the discharge opening.

48. The feed accelerator system of claim 1 or 15 wherein the feed pipe is disposed concentrically within the conveyor hub.

49. The feed accelerator system of claim 1 or 15 wherein the outer edge of at least one disc member extends into a zone formed between the conveyor hub and the bowl.

50. The feed accelerator system of claim 49 wherein the outer edge of at least one disc member extends into a slurry separation pool located within the zone formed between the conveyor hub and the bowl.

51. The feed accelerator system of claim 1 or 15 wherein a slurry separation pool having a pool surface is formed on an inside surface of the centrifuge, and the stand-off distance, feed slurry flow rate, diameter of the feed pipe, starting radius at which the disc vanes extend from the disc opening and the target surface, number of disc vanes, forward angle of discharge at disc vane exit, and spacing between the inside surfaces of the first and second discs are selected so that the feed slurry exits the accelerator at a linear circumferential speed substantially equal to or greater than the linear circumferential speed of the pool surface.

52. A feed accelerator system for use in a centrifuge, the system comprising an accelerator rotatably mounted within the centrifuge and including a plurality of spaced disc members each having an outer radius, a feed pipe disposed within the centrifuge for delivering a feed slurry to the accelerator, and a plurality of disc vanes extending substantially between adjacent discs and extending from a smaller radius and terminating at a larger radius smaller than the outer radius of either or both discs, so as to form a disc smoothener adapted to smooth out the flow of feed slurry to produce circumferential flow uniformity.

53. A method for accelerating a liquid in a centrifuge in which a liquid passes in a generally outward or radial direction from a feed pipe disposed within the centrifuge to a zone outside of a conveyor hub disposed within the centrifuge and forms an annular-shaped pool, comprising separating the liquid into a plurality of feed streams, accelerating the liquid feed streams circumferentially in the direction of rotation and converting the liquid from a plurality of liquid feed streams to a wide, evenly distributed, smooth flow having a speed substantially the same as the speed of the pool surface as the flow enters the pool.

* * * * *